(12) United States Patent
Hill, Jr. et al.

(10) Patent No.: US 6,401,338 B1
(45) Date of Patent: Jun. 11, 2002

(54) METHOD OF REMOVING A BEARING INSERT FROM A SKATE WHEEL

(76) Inventors: William C. Hill, Jr.; Richard L. Hill, both of 4018 42nd Ave. North, St. Petersburg, FL (US) 33714

( * ) Notice: Subject to any disclaimer, the term of this patent is extended or adjusted under 35 U.S.C. 154(b) by 82 days.

(21) Appl. No.: 09/612,704

(22) Filed: Jul. 10, 2000

Related U.S. Application Data

(63) Continuation-in-part of application No. 08/857,238, filed on May 16, 1997, now Pat. No. 6,085,402, which is a continuation-in-part of application No. 08/168,669, filed on Dec. 16, 1993, now Pat. No. 5,964,537, which is a continuation-in-part of application No. 08/050,507, filed on Apr. 20, 1993, now Pat. No. 5,271,633.

(51) Int. Cl.[7] .................................................. B23P 17/00
(52) U.S. Cl. ......................... 29/898.08; 29/724; 29/280
(58) Field of Search .............................. 29/898.08, 278, 29/279, 280, 255, 724, 426.1, 426.5, 270, 770

(56) References Cited

U.S. PATENT DOCUMENTS

| | | |
|---|---|---|
| 1,506,258 A | 8/1924 | Shaw |
| 1,516,189 A | 11/1924 | Hebert |
| 1,536,553 A | 5/1925 | Anderson, Jr. |
| 1,544,246 A * | 6/1925 | Leslie |
| 1,776,194 A * | 9/1930 | Leftwich |
| 1,851,116 A | 3/1932 | Spiro |
| 2,105,354 A | 1/1938 | Hoerle |
| 3,309,155 A | 3/1967 | Palmer |
| 3,837,662 A | 9/1974 | Marks et al. |
| 3,945,104 A | 3/1976 | Brookover, Jr. |
| 4,034,995 A | 7/1977 | Forward et al. |
| 4,110,886 A * | 9/1978 | Wendler et al. ................ 29/255 |
| 4,666,168 A | 5/1987 | Hamill et al. |
| 4,666,169 A | 5/1987 | Hamill et al. |
| 4,940,342 A | 7/1990 | Miyazawa et al. |
| 5,165,169 A * | 11/1992 | Boyce ..................... 29/898.08 |
| 5,355,572 A * | 10/1994 | Kammeraad et al. ...... 29/213.1 |
| 6,032,364 A * | 3/2000 | De Marchi .............. 29/898.08 |

* cited by examiner

Primary Examiner—David P. Bryant
(74) Attorney, Agent, or Firm—Larson & Larson, P.A.; James E. Larson

(57) ABSTRACT

A method of removing a bearing insert from a skate wheel is performed utilizing a bearing insert tool. The bearing insert has a central axial bore corresponding to the diameter of a central axial bore of a spacer element. A transverse bore is formed through a middle portion of the spacer element. The spacer element middle portion has a larger outer circumference than that of its opposed side portions. The spacer element opposed side portions mount within the inner circumference of the bearing inserts such that inner side walls of the bearing inserts abut opposed side walls of the spacer element middle portion. The bearing insert tool has a shaft containing spring activated nipples on a distal end. A button on the tool head portion operates the spring. To remove the bearing inserts the button is depressed retracting the nipples. The shaft is then inserted within the central axial bore of the spacer element through the proximal bearing insert. The nipples are released and allowed to engage the spacer element transverse bore. Force is then exerted in an axial direction towards the skate wheel to push the distal bearing insert out of the wheel hub. Thereafter, force is exerted in an axial direction away from the skate wheel to pull the proximal bearing insert and spacer element out of the wheel hub.

20 Claims, 7 Drawing Sheets

METHOD OF REMOVING A BEARING INSERT FROM A SKATE WHEEL

PRIOR APPLICATIONS

This application is a continuation-in-part of Ser. No. 08/857,238, filed May 16, 1997, U.S. Pat. No. 6,085,402 which is a continuation-in-part of Ser. No. 08/168,699, filed Dec. 16, 1993, U.S. Pat. No. 5,964,537, which is a continuation-in-part of Ser. No. 08/050,507, filed Apr. 20, 1993, U.S. Pat. No. 5,271,633.

BACKGROUND OF THE INVENTION

1. Field of the Invention

This invention relates to bearing inserts for skates. More particularly, it relates to a method for removing and inserting a pair of ball bearing inserts from a hub of a wheel of in-line skates, roller skates, and skateboards.

2. Description of Prior Art

In-line skates, roller skates, and skateboards are well known and currently used by individuals for purposes of exercise and pleasure. In-line skates are additionally used in racing competition. Some examples of in-line skates are seen in U.S. Pat. Nos. 3,837,662, 4,034,995, 4,666,168, and 4,666,169.

Individuals who use in-line skates, roller skates, and skateboards for exercise and pleasure must keep their respective skates in good working order and must periodically replace worn out parts, such as wheels and bearings, so that the skate may continue to function properly. Individuals who race and compete using in-line skates must keep their skates in top working condition and are frequently forced to replace parts, such as wheels and bearings, during competition due to additional stress placed on the wheels and bearings during such competition. As bearings rotate, flaking of the metal balls and metal races occurs leaving small metal particles within the bearing. This flaking is accelerated in high stress performance use of the skate, such as competition.

The known in-line skates, roller skates, and skateboards do not have easily replaceable bearings to permit quick replacement of the bearings in the wheel. Bearings that are known and currently used in in-line skates, roller skates, and skateboards which are not quick release are shown in U.S. Pat. Nos. 2,105,354 and 3,309,155. Further, the known in-line skates are not equipped with alignment elements which would enable the skater to quickly drop in and align a wheel for rapid replacement. These two inadequacies cause a competitive skater to use too much time for repairs thereby resulting in either a loss or disqualification from a race. Individuals using skates for pleasure and exercise are forced to have their skates maintained by a repairman due to not having the proper tools to replace conventional bearings. In addition, known bearings used in skates utilize a spacing element between the pair of bearings in each respective wheel. This additional element is sometimes misplaced during replacement of the bearings thereby causing the wheel of a skate to not function.

There exists a need for a quick release bearing insert for in-line skates, roller skates, and skateboards. Additionally, there exists a need for a bearing insert incorporating the spacing element integrally into the bearing insert thereby eliminating the need for a separate spacing element. If the separate spacing element is to be used, there exits a need for a means to quickly align the separate spacing element. Further, it would be advantageous to incorporate and attach a reflective element to an outer surface of a skate wheel to brightly illuminate a skater, especially for use during twilight and night time hours. Still further, there exits a need for a method for removing and inserting bearing inserts from a skate wheel which employs a bearing insert tool.

SUMMARY OF THE INVENTION

I have invented an improved skate bearing spacer with a pull tool which enables a skater to quickly remove and insert bearings in a wheel of an in-line skate, roller skate, and skateboard with minimal effort. I have provided a means for removing a separate spacer element without touching the bearings. Such means employing a bearing insert tool constitutes an inventive method for removal and insertion of the bearings and spacing element from and into the hub of the skate wheel.

My method functions with skate bearing inserts employing ball bearings positioned intermediate an outer and inner race. My method employs two bearing inserts spaced apart mounted on a spacer element. A first and second end of the spacer element axially mounts a bearing. A middle portion of the spacer element has a greater diameter than the first and second ends so that an inner side of each bearing abuts an opposite side of the spacer middle portion. The middle portion of the spacer element has a transverse bore to engage with nipples of a bearing insert tool and to lessen the overall weight of the spacer element. The bearing insert tool has a shaft, a head portion, nipples on the shaft, and a finger grip portion. A spring within the shaft moves a longitudinal guide to provide a space for the nipples to retreat. The bearing insert tool enables an individual to quickly remove and replace the spacer element and bearing inserts thereby eliminating the need for the individual to touch the bearing insert during the removal and replacement process. Additionally, the bearing insert tool provides a means for cleaning the bearing inserts without touching them.

The pair of opposed bearing inserts surround the ends of the spacer element when the bearing inserts and spacer element are inserted within a skate wheel hub. The outer diameter of the spacer element ends and the bearing inserts central axial bore diameters are about equal.

Removal of either bearing insert is accomplished by inserting the shaft of the bearing insert tool into the central axial bore of one of the bearing inserts and spacer element. The spring controlled nipples along a distal end of the tool are retracted prior to insertion by depressing a button communicating with the spring. Release of the button allows the nipples to return to a relaxed state causing engagement of the nipples with the transverse bore of the spacer element. Inwardly exerted axial force is first applied to push the distal bearing insert out of the skate wheel hub. Thereafter, outwardly exerted axial force pulls the proximal bearing insert and spacer element from the skate wheel hub. The bearing insert tool is also capable of engaging a rachet-style nut adapter or a hex-style Allen-key adapter for facilitating the removal of the skate wheel shaft.

BRIEF DESCRIPTION OF THE DRAWINGS

The invention may be best understood by those having ordinary skill in the art by reference to the following detailed description when considered in conjunction with the accompanying drawings in which:

FIG. 9 is a perspective view of a bearing insert tool used in the present invention which can engage adapters for use in removing a shaft member from a skate wheel.

DETAILED DESCRIPTION OF THE INVENTION

Figure 1:
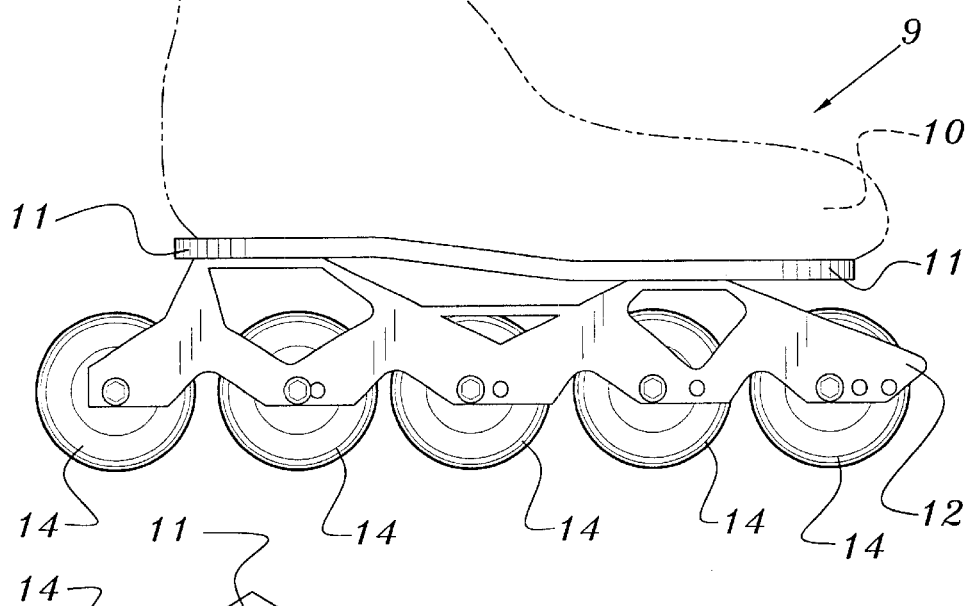
FIG. 1 is a side elevational view of an in-line skate housing with mounted wheels attached to a boot.

Throughout the following detailed description, the same reference numerals refer to the same elements in all figures.

Figure 3:
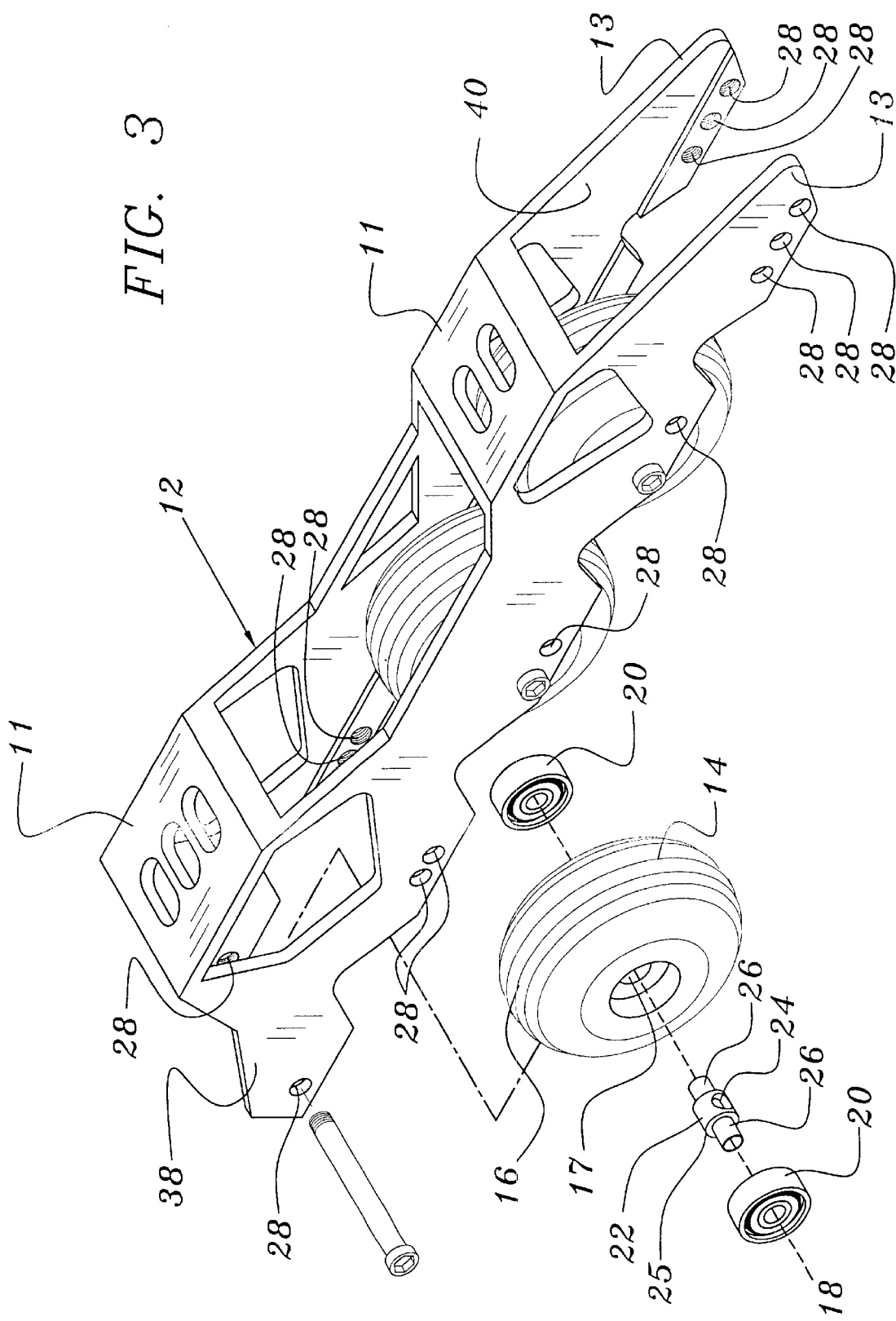
FIG. 3 is an exploded view of the in-line skate housing showing a skate wheel, a pair of bearing inserts, a spacer element and a shaft member removed from a hub of the skate wheel and frame of the skate housing.
Figure 4:
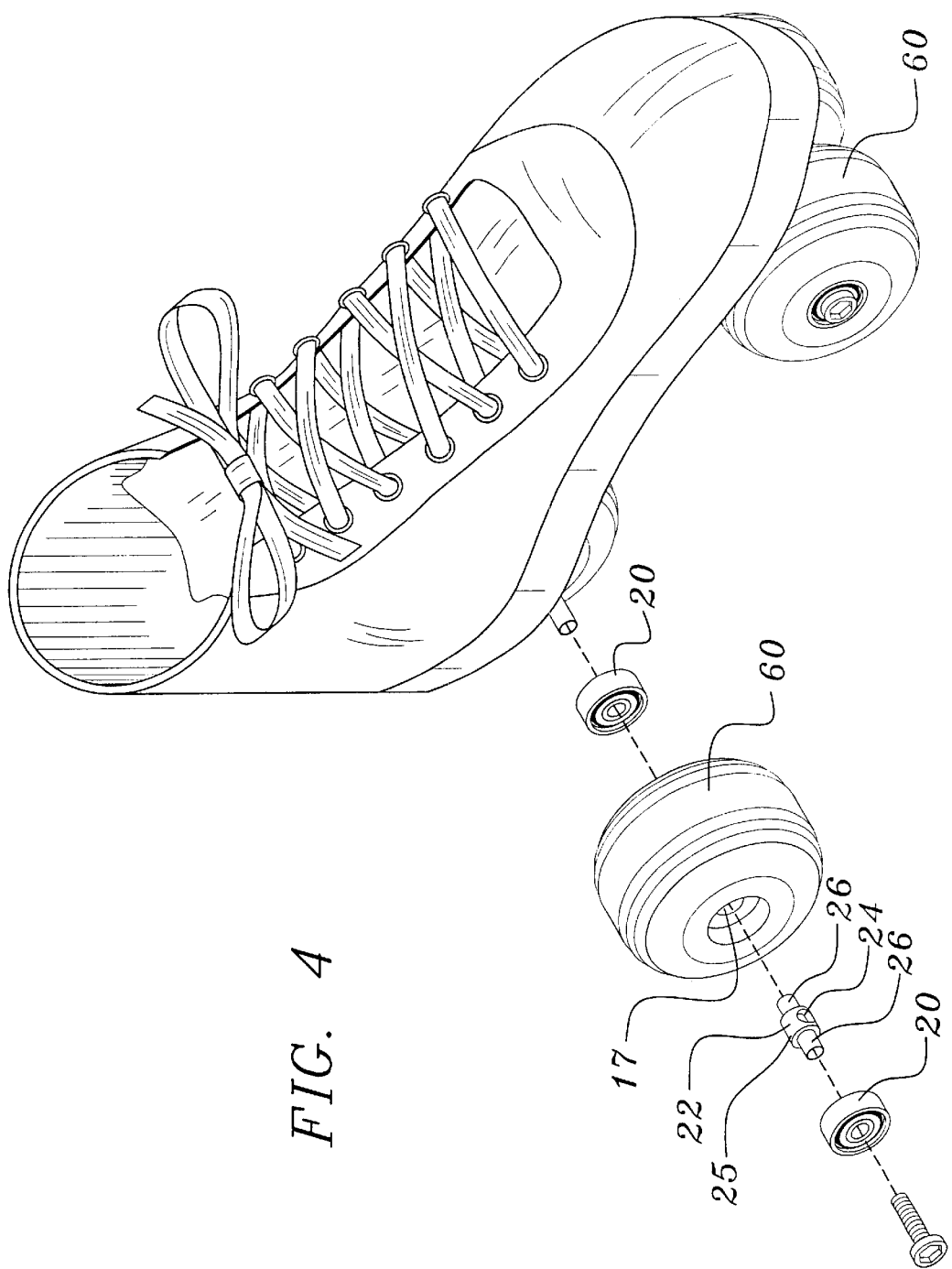
FIG. 4 is a perspective view of a roller skate with an exploded view of a roller skate wheel showing a pair of bearing inserts mounted on end portions of a spacer element with a shaft member inserting therethrough.
Figure 5:
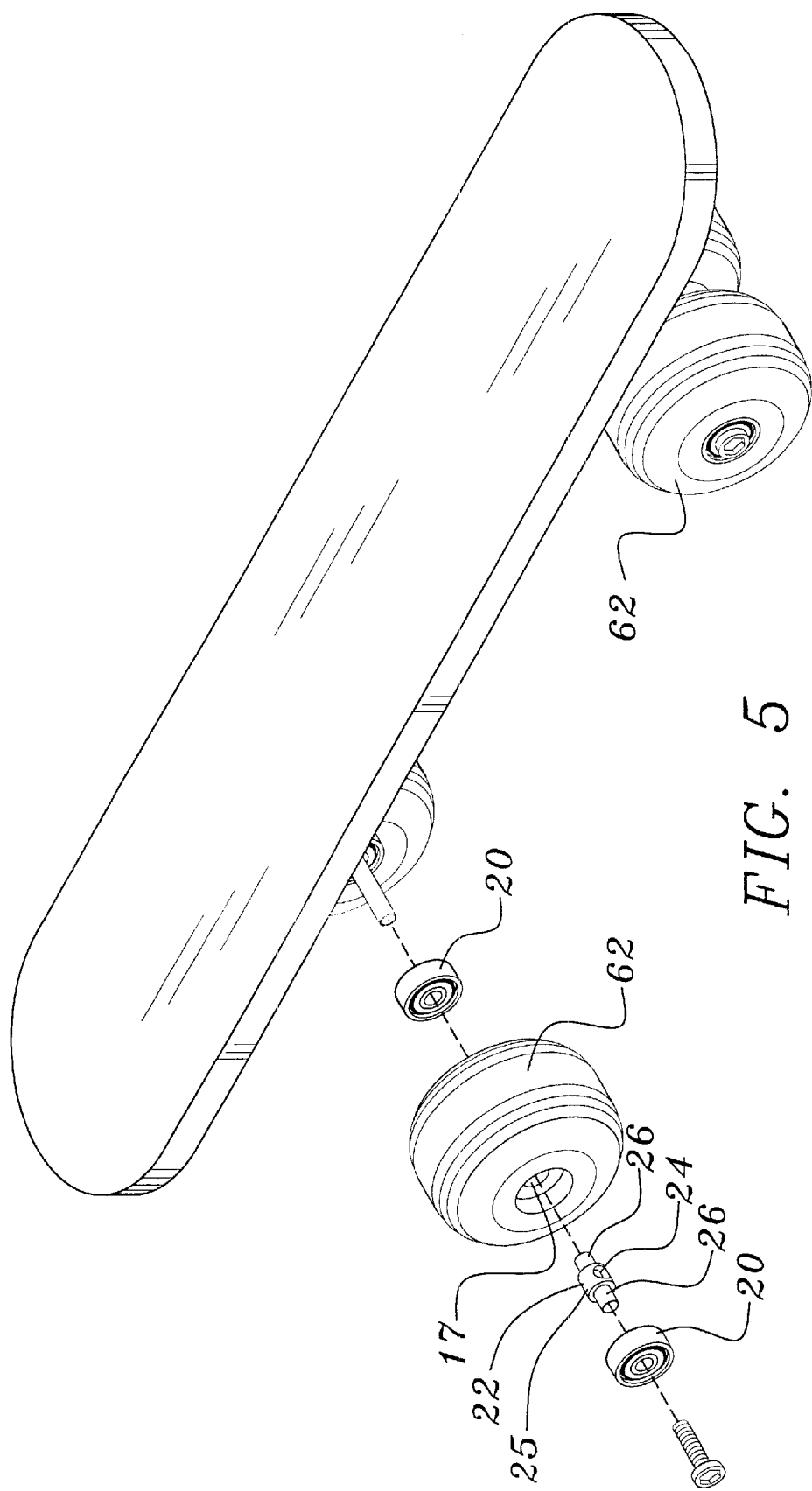
FIG. 5 is a perspective view of a skateboard with an exploded view of a skateboard wheel showing a pair of bearing inserts mounted end portions of a spacer element with a shaft member inserting therethrough.
Figure 6:
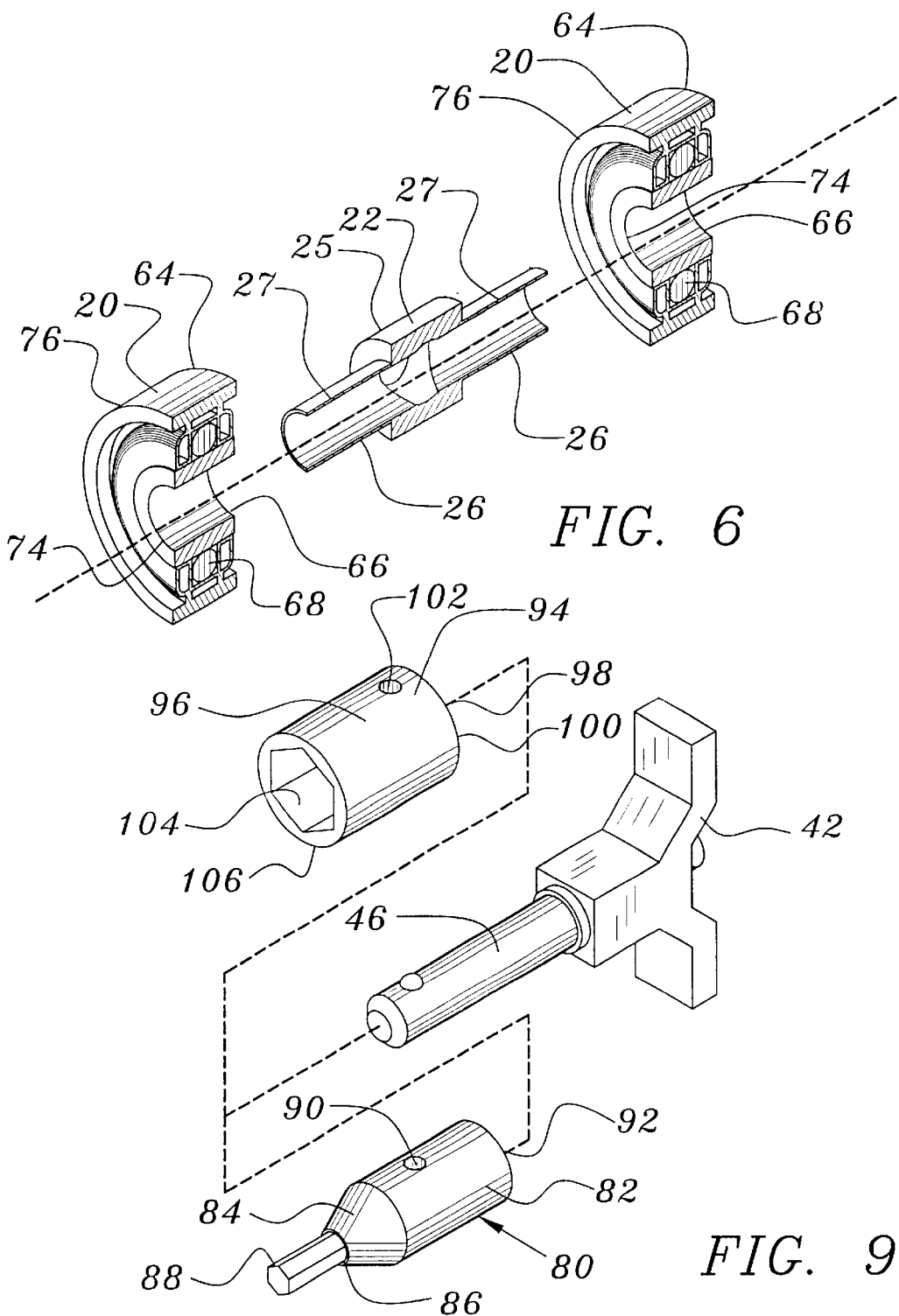
FIG. 6 is an exploded cross-sectional perspective view of a bearing insert and spacer element of which can be inserted into a skate wheel hub.

A pair of bearing inserts 20 separated by spacer element 22 are inserted into a hub 17 of an in-line skate wheel 14 as shown in FIG. 3, a roller skate wheel 60 as shown in FIG. 4, or a skateboard wheel 62 as shown in FIG. 5. Bearing insert 20 has a cylindrical inner race 66, a cylindrical outer race 64 rotatable around inner race 66, a ball bearing positioner inserted between outer and inner races, 64 and 66 respectively, and a set of ball bearings 68 inserted between outer and inner races, 64 and 66 respectively, as shown in FIG. 6. Ball bearings 68 are held in place by the ball bearing positioner.

Referring to FIG. 6, bearing insert 20 has an inner circumference 74, and an outer circumference 76. Spacer element 22 has first and second axial ends 26 on which the bearing inserts 20 are axially mounted. A diameter of an outer circumference 27 of the two axial ends 26 are about equal to a diameter of bearing insert inner circumference 74. A middle portion 25 of the spacer element 22 has a through bore 24 (see FIGS. 3–5) in which retractable nipples of a hand tool will engage. The pair of bearing inserts 20 and spacer element 22 are frictionally mounted within hub 17 of in-line skate wheel 14, roller skate wheel 60 or skate board wheel 62 when inserted therewithin as shown in FIGS. 3–5, respectively.

Figure 7:
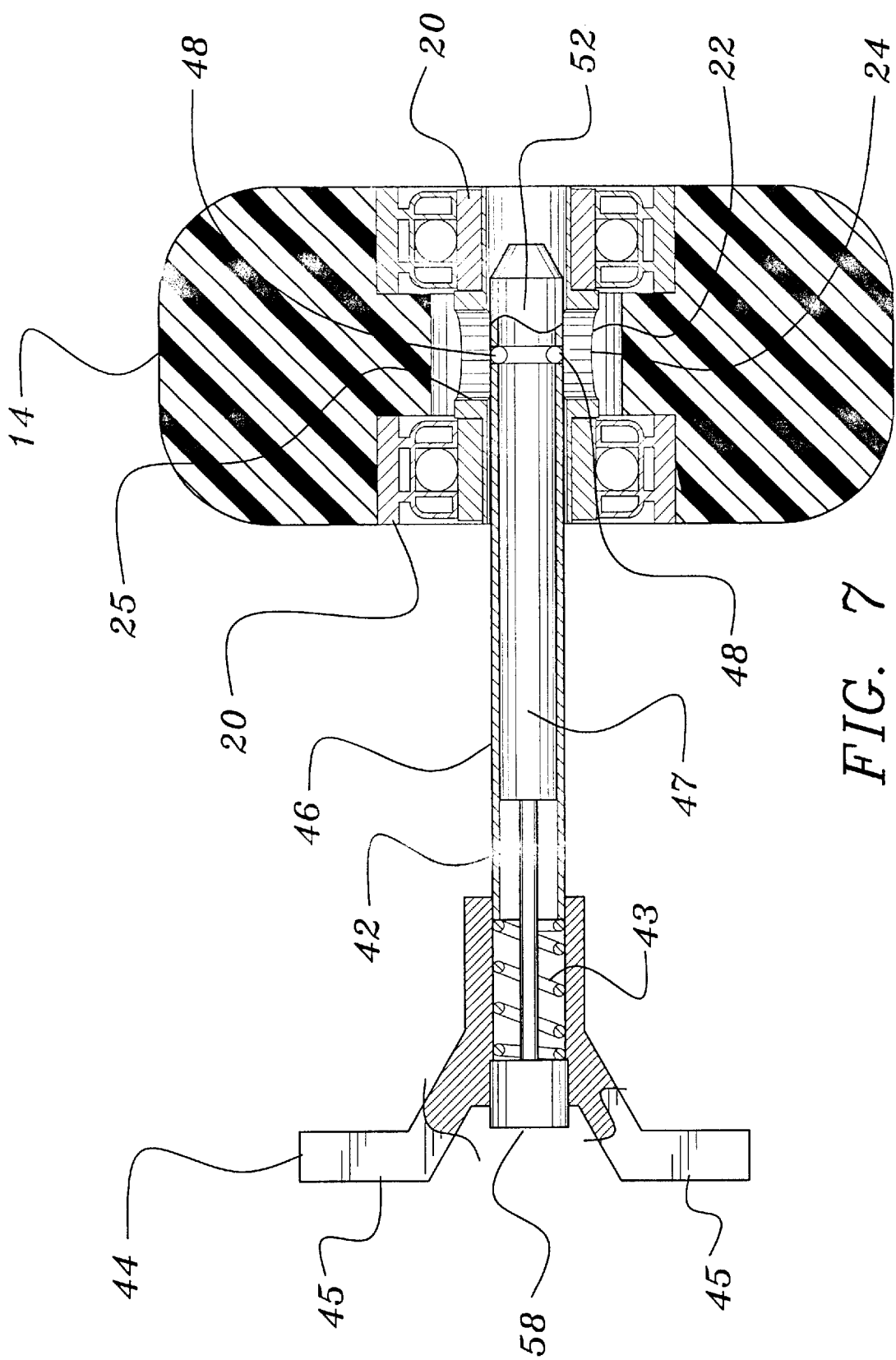
FIG. 7 is a cross-sectional view of an in-line skate wheel employing a pair of bearing inserts and a separate spacer element with a bearing insert tool engaging the spacer element.
Figure 8:
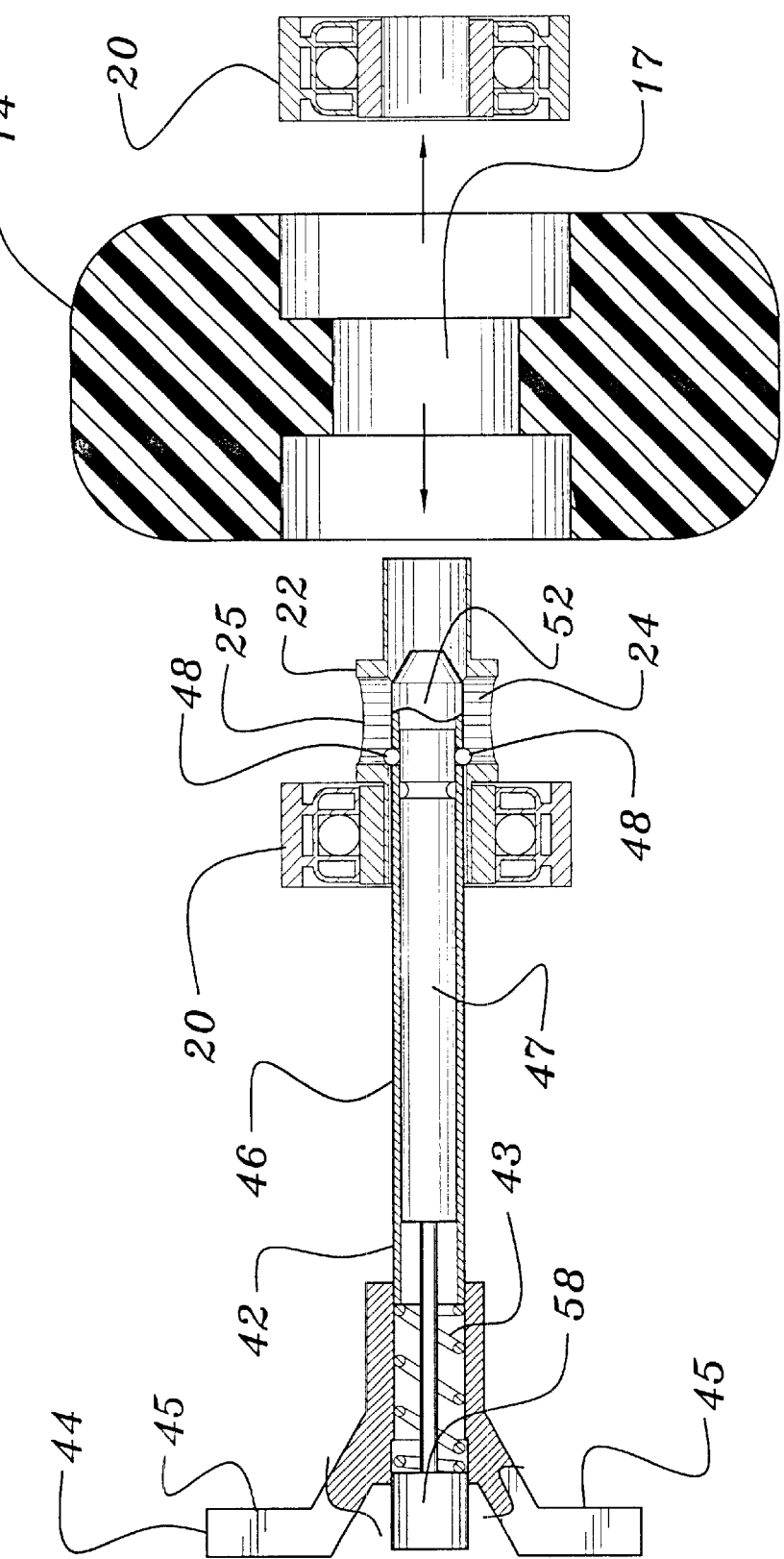
FIG. 8 is a cross-sectional view of an in-line skate wheel employing a pair of bearing inserts and a separate spacer element with a bearing insert tool engaging and removing the spacer element and a proximal bearing insert from the skate wheel hub after it has pushed a distal bearing insert from the skate wheel.

Bearing insert 20 is inserted and removed from hub 17 of skate wheel 14 utilizing a bearing insert tool 42, as shown in FIGS. 7 and 8. Bearing insert tool 42 has a head portion 44, a shaft 46, nipples 48 located at a first distal end 52 to head portion 44, a spring 43, enclosed within shaft 46, a spring activation button 58 located in head portion 44, and a finger grip 45.

In practicing the method of the present invention, an individual utilizes a bearing insert tool 42. Referring to FIGS. 7 and 8, button 58 of tool 42 is depressed. The spring 43 moves a rod 47 within shaft 46, so that a space is created and nipples 48 can be retracted into that space. Shaft 46 is inserted within central axial bores of bearing insert 20 and spacer element 22. Thereafter, button 58 is released allowing nipples 48 to return to a relaxed state causing them to protrude from shaft 46 and to engage with the wall of bore 24 in the middle portion 25 of spacer element 22. Once engagement has occurred, inwardly exerted axial force is applied to push the distal bearing insert from out of the wheel hub 17. Thereafter, outwardly exerted force is applied thereby removing spacer element 22 and the proximal bearing insert 20, as shown in FIGS. 7 and 8. Insertion of bearing insert 20 can be accomplished in one manner by pushing one of the bearing inserts 20 into hub 17, dropping self centering spacer element 22 into hub 17 such that spacing element central axial bore is aligned with bearing insert 20 central axial bore and then pushing the other bearing insert 20 into hub 17 on the opposed side.

Prior to removing the bearing inserts 20, one must first remove shaft member 34. In doing so, bearing insert tool 42 can be utilized with the assistance of an adapter. A shown in FIG. 9, at least two styles of adapters can be employed. The choice of adapter depends on the type of shaft member being removed. If shaft member 34 having a hex-style bore formed in its top end (as shown in FIG. 3) is being used, then one would utilize first adapter 80. First adapter 80 has a circular tail portion 82, a cone shaped top portion 84 formed at an apex thereof, a hex-style shaft 88 inserted within bore 86 protruding away from tail portion 82, a pair of transverse bores 90 formed through tail portion 82 (only one shown) fro receiving bearing insert tool nipples 48 and an inner circumference 92 of tail portion 82 which has a diameter about equal to the circumference of bearing insert tool shaft 46. If a shaft member having a hex-bolt head is being used which receives a screw from an opposed end (as shown in FIGS. 4 and 5), then one would utilize second adapter 94. Second adapter 94 has a single circular housing 96 having a central axial bore 98 formed in a first end 100 which has an inner circumference about equal to that of the outer circumference of bearing insert tool shaft 46. A pair of transverse bores 102 (only one shown) are formed through circular housing 96 for receiving bearing insert nipples 48. A hex-style bore 104 formed in a second end 106 of second adapter 94 engages the hex bolt head of the respective shaft member.

Figure 2:
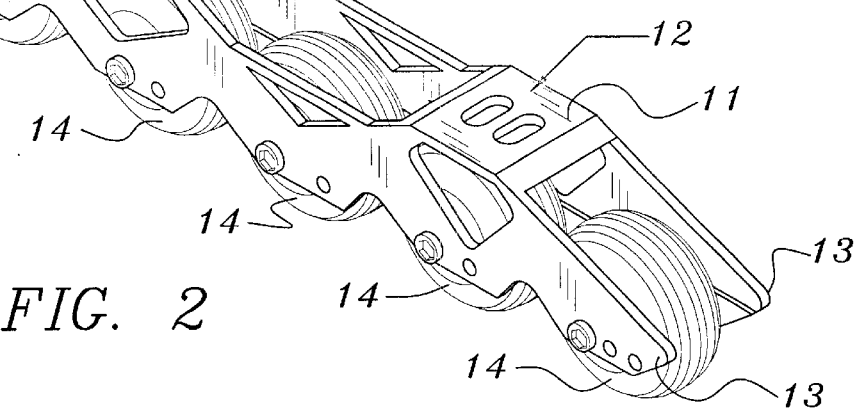
FIG. 2 is a perspective view of the in-line skate housing with five mounted wheels.

Referring to FIG. 1, bearing inserts 20 can be used with an in-line skate 9 of the following description. A skate boot 10 is attached by conventional means to a horizontal top plane 11 of a skate housing assembly 12. A single row of skate wheels 14 are aligned along an undercarriage of skate housing 12 as shown in FIG. 2. The row of skate wheels 14 are bolted to identical skirts 13 descending from opposite longitudinal side edges of top plane 11 as shown in FIG. 2.

Skate wheel 14 consists of a circular polymer member 16, a mounting hub 17, and wheel axial bore 18 manufactured to receive a pair of bearing inserts 20 as shown in FIG. 3. When utilizing a pair of bearing inserts 20, each can be pressed into opposite sides of wheel axial bore 18. A first bearing insert is mounted on spacer element 22 end portion 26 and then pushed into hub 17. The second bearing insert is then pushed into the other side of hub 17 to align on the opposed axial end 26.

Each descending skirt 13 of skate housing 12 contains a plurality of transverse bores 28 located along the longitudinal side plane of skate housing 12 as shown in FIG. 3. Each transverse bore 28 has a corresponding wheel alignment pocket 30 (not shown) located on the inside surface of descending skirt 13 of skate housing 12.

A shaft member 34, having a hex-style bor 35 formed in a top portion axially aligns transverse bore 28 at a first side 38 on frame skirt 13 with bearing insert 20 as shown in FIG. 5. Shaft member 34 also has a threaded end 37 for engaging threads located within the transverse bores 28 on a second side 40 of the frame skirt 13 as shown in FIG. 3.

Different skate wheels 14 of varying diameters and number may be substituted in skate housing 12. Skate housing 12 may accommodate 3 to 5 skate wheels 14 with diameters ranging from 76 mm to 82 mm.

Skate frame housing 12 is generally made from a strong lightweight metal such as aluminum or titanium, but also could be constructed with a high strength polymer. Shaft member 34 is generally made from high strength aluminum. Circular member 16 and hub 17 of skate wheel 14 are generally made from a hard polymer.

Bearing insert 20 may be used with an in-line skate 9 of a different description than described above. Additionally, bearing insert 20 can be used with a roller skate wheel 60 as shown in FIG. 4 or a skateboard wheel 62 as shown in FIG. 5.

Equivalent mechanical devices can be substituted for the ones set forth above to achieve the same results in the same manner. As well, equivalent steps can be employed for the ones set forth above to also achieve the same results in the same manner.

Having thus described the invention what is claimed and desired to be secured by Letters Patent is:

1. A method of removing a bearing insert from a hub of a skate wheel having a central axis, the method comprising the steps of:
   a) providing a tool comprising a cylindrical hollow shaft with a first and second end, a set of retractable nipples located within the hollow shaft second end extending transversely therethrough, a means for retracting the set of nipples transversely into the cylindrical hollow shaft and a means for activating the means for retracting;
   b) providing a proximal and distal bearing insert axially mounted at opposed cylindrical end portions of a spacer element within the skate wheel hub central axis, the spacer element having a central cylindrical portion disposed between the opposed cylindrical end portions, the central cylindrical portion having a larger diameter than that of each opposed cylindrical end portion on which each bearing insert is mounted;
   c) providing a pair of transverse bores formed through the spacer element central cylindrical portion, the pair of transverse bores adapted to receive the set of nipples from the tool;
   d) applying force to the means for activating the means for retracting causing the set of nipples to retract transversely into the tool cylindrical hollow shaft;
   e) inserting the tool cylindrical hollow shaft through a central axial bore of the proximal bearing insert and into the spacer element;
   f) releasing the force from the means for activating the means for retracting thereby causing the set of nipples to transversely extend through the pair of transverse bores and engage a side wall of each transverse bore;
   g) applying axial force towards the skate wheel hub thereby pushing the distal bearing insert thereout; and
   h) applying axial force away from the skate wheel hub thereby pulling the proximal bearing insert and spacer element therefromout.

2. The method of claim 1, wherein the means for retracting the set of nipples is a spring disposed within the cylindrical hollow shaft, the spring communicating with the means for activating the means for retracting.

3. The method of claim 2, wherein the means for activating the means for retracting is a depressible button located on a top portion of the tool first end.

4. The method of claim 3, wherein the spring is in a relaxed state when the depressible button is not engaged and the spring is in a non-relaxed state when the depressible button is engaged.

5. The method of claim 4, wherein the nipples transversely extend from the tool cylindrical hollow shaft when the spring is in a relaxed state and transversely retract into the tool cylindrical hollow shaft when the spring is in a non-relaxed state.

6. The method of claim 1, wherein the tool further comprises a top portion located at the tool first end, the top portion having a crown portion and a pair of finger grip members.

7. The method of claim 1, wherein the proximal and distal bearing insert have equal inner circumference diameters.

8. The method of claim 7, wherein the spacer element opposed cylindrical end portions have an outer circumference diameter that is equal to or less than that of the proximal and distal bearing insert inner circumference diameters.

9. The method of claim 1, wherein the skate wheel is chosen from the group consisting of an in-line skate wheel, a roller skate wheel and a skateboard skate wheel.

10. The method of claim 1, wherein the tool cylindrical hollow shaft can engage a plurality of adapters for removing a shaft member inserted through the skate wheel hub.

11. The method of claim 1, wherein prior to the step of inserting the tool cylindrical hollow shaft through a central axial bore of the proximal bearing insert and into the spacer element, further comprising the steps of:
   a) providing an adapter including a cylindrical tail portion having first and second ends, an integral cone-shaped top portion formed at the tail portion second end and having an aperture formed in an apex thereof, a central axial bore formed at the tail portion first end, a hex-style shaft portion inserted within the cone-shaped top portion aperture, the central axis having an inner circumference diameter equal to that of the tool cylindrical hollow shaft;
   b) providing a cylindrical shaft member having a distal threaded end and a proximal head portion with a hex-style bore formed therein, the cylindrical shaft member inserted through the skate wheel hub central axis such that the distal threaded end engages threads disposed within bores formed in a descending skirt member of an in-line skate frame;
   c) inserting the adapter tail portion first end over the tool cylindrical hollow shaft second end;
   d) inserting the adapter hex-style shaft portion into the shaft member proximal head portion hex-style bore;
   e) removing the shaft member from the skate wheel hub central axis by turning the tool in a counter-clockwise direction; and
   f) removing the adapter from the tool cylindrical hollow shaft.

12. The method of claim 11, wherein the adapter further includes a pair of transverse bores formed through the cylindrical tail portion, the transverse bores engaging the tool set of retractable nipples.

13. The method of claim 1, wherein prior to the step of inserting the tool cylindrical hollow shaft through a central axial bore of the proximal bearing insert and into the spacer element, further comprising the steps of:

a) providing an adapter including a single cylindrical housing having first and second ends, a cylindrical axial bore formed in the first end and a hex-style bore formed in the second end, the cylindrical axial bore having an inner circumference diameter equal to that of the tool cylindrical hollow shaft;

b) providing a cylindrical shaft member having a distal hex-style head portion and a proximal threaded opening, the cylindrical shaft member inserted through the distal bearing insert in the skate wheel hub;

c) providing a threaded screw inserted through the proximal bearing insert in the skate wheel hub and engaging the cylindrical shaft member proximal threaded opening;

d) inserting the adapter first end cylindrical axial bore over the tool cylindrical hollow shaft;

e) inserting the adapter second end hex-style bore over the cylindrical shaft member distal hex-style head portion;

f) removing the shaft member from the skate wheel hub central axis by turning the tool in a counter-clockwise direction while applying axial force upon a top portion of the screw; and g) removing the adapter from the tool cylindrical hollow shaft.

14. The method of claim 13, wherein the adapter further includes a pair of transverse bores formed through the cylindrical housing, the transverse bores engaging the tool set of retractable nipples.

15. The method of claim 13, wherein the skate wheels are chosen from the group consisting of a roller skate wheel and a skateboard wheel.

16. A method of removing a bearing insert from a hub of a skate wheel having a central axis, the method comprising the steps of:

a) providing a tool comprising a cylindrical hollow shaft with a first and second end, a set of retractable nipples located within the hollow shaft second end extending transversely therethrough, a spring inserted within hollow shaft for retracting the set of nipples transversely therein, and a depressible button for activating the spring;

b) providing a proximal and distal bearing insert axially mounted at opposed cylindrical end portions of a spacer element within the skate wheel hub central axis, the spacer element having a central cylindrical portion disposed between the opposed cylindrical end portions, the central cylindrical portion having a larger diameter than that of each opposed cylindrical end portion on which each bearing insert is mounted, the proximal and distal bearing inserts having equal inner circumference diameters;

c) providing a pair of transverse bores formed through the spacer element central cylindrical portion, the pair of transverse bores adapted to receive the set of nipples from the tool;

d) applying force to the depressible button thereby activating the spring causing the set of nipples to retract transversely into the tool cylindrical hollow shaft;

e) inserting the tool cylindrical hollow shaft through a central axial bore of the proximal bearing insert and into the spacer element;

f) releasing the force from the depressible button thereby deactivating the spring causing the set of nipples to transversely extend through the pair of transverse bores and engage a side wall of each transverse bore;

g) applying axial force towards the skate wheel hub thereby pushing the distal bearing insert thereout; and h) applying axial force away from the skate wheel hub thereby pulling the proximal bearing insert and spacer element therefromout.

17. The method of claim 16, wherein the spring is in a relaxed state and the nipples transversely extend from the tool cylindrical hollow shaft when the depressible button is not engaged and the spring is in a non-relaxed state and the nipples retract into the tool cylindrical hollow shaft when the spring is in a non-relaxed state.

18. The method of claim 16, wherein the spacer element opposed cylindrical end portions have an outer circumference diameter that is equal to or less than that of the proximal and distal bearing insert inner circumference diameters.

19. The method of claim 16, wherein prior to the step of inserting the tool cylindrical hollow shaft through a central axial bore of the proximal bearing insert and into the spacer element, further comprising the steps of:

a) providing an adapter including a cylindrical tail portion having first and second ends, an integral cone-shaped top portion formed at the tail portion second end and having an aperture formed in an apex thereof, a central axial bore formed at the tail portion first end, a hex-style shaft portion inserted within the cone-shaped top portion aperture, a pair of transverse bores formed through the cylindrical tail portion, the transverse bores engaging the tool set of retractable nipples, and the central axis having an inner circumference diameter equal to that of the tool cylindrical hollow shaft;

b) providing a cylindrical shaft member having a distal threaded end and a proximal head portion with a hex-style bore formed therein, the cylindrical shaft member inserted through the skate wheel hub central axis such that the distal threaded end engages threads disposed within bores formed in a descending skirt member of an in-line skate frame;

c) inserting the adapter tail portion first end over the tool cylindrical hollow shaft second end;

d) inserting the adapter hex-style shaft portion into the shaft member proximal head portion hex-style bore;

e) removing the shaft member from the skate wheel hub central axis by turning the tool in a counter-clockwise direction; and f) removing the adapter from the tool cylindrical hollow shaft.

20. The method of claim 16, wherein prior to the step of inserting the tool cylindrical hollow shaft through a central axial bore of the proximal bearing insert and into the spacer element, further comprising the steps of:

a) providing an adapter including a single cylindrical housing having first and second ends, a cylindrical axial bore formed in the first end, a hex-style bore formed in the second end and a pair of transverse bores formed through the cylindrical housing, the transverse bores engaging the tool set of retractable nipples, the cylindrical axial bore having an inner circumference diameter equal to that of the tool cylindrical hollow shaft;

b) providing a cylindrical shaft member having a distal hex-style head portion and a proximal threaded opening, the cylindrical shaft member inserted through the distal bearing insert in the skate wheel hub;

c) providing a threaded screw inserted through the proximal bearing insert in the skate wheel hub and engaging the cylindrical shaft member proximal threaded opening;

d) inserting the adapter first end cylindrical axial bore over the tool cylindrical hollow shaft;

e) inserting the adapter second end hex-style bore over the cylindrical shaft member distal hex-style head portion;

f) removing the shaft member from the skate wheel hub central axis by turning the tool in a counter-clockwise direction while applying axial force upon a top portion of the screw; and g) removing the adapter from the tool cylindrical hollow shaft.

* * * * *